United States Patent [19]

Hevoyan

[11] Patent Number: 4,838,135
[45] Date of Patent: Jun. 13, 1989

[54] WORK TRANSPORT FOR MACHINE TOOLS

[76] Inventor: Varoujan H. Hevoyan, 6318 W. 77th St., Los Angeles, Calif. 90045

[21] Appl. No.: 48,567

[22] Filed: May 11, 1987

Related U.S. Application Data

[63] Continuation-in-part of Ser. No. 891,114, Jul. 31, 1986, abandoned.

[51] Int. Cl.⁴ .............................................. B23B 13/00
[52] U.S. Cl. .......................................... 82/124; 82/162
[58] Field of Search ............... 82/2.5, 2.7, 34 R, 38 R;
414/744 R, 670; 901/15; 269/45, 69, 71;
144/209 A; 51/215 R, 215 AR; 29/563; 403/16,
370; 16/243, 244, 248, 245; 254/98, 134;
248/200.1

[56] References Cited

U.S. PATENT DOCUMENTS

| 964,394 | 7/1910 | Coddington | 254/134 |
|---|---|---|---|
| 1,422,140 | 7/1922 | Sears | 82/2.5 |
| 2,062,741 | 12/1936 | Czerniak | 82/2.5 |
| 2,315,393 | 3/1943 | Bowerman | 82/34 R |
| 3,247,979 | 4/1966 | Melton et al. | 901/15 |
| 3,870,278 | 3/1975 | Lee | 248/354.3 |
| 4,061,062 | 12/1977 | Peltier | 82/2.7 |
| 4,070,011 | 1/1978 | Glesser | 269/45 |
| 4,317,394 | 3/1982 | Link et al. | 82/2.7 |

FOREIGN PATENT DOCUMENTS

| 0691591 | 7/1964 | Canada | 414/670 |
|---|---|---|---|
| 104891 | 4/1984 | European Pat. Off. | 82/2.7 |
| 1021928 | 7/1950 | France | 248/354.3 |
| 66603 | 4/1983 | Japan | 82/2.5 |
| 0066603 | 4/1983 | Japan | 82/2.5 |

Primary Examiner—Frederick R. Schmidt
Assistant Examiner—Lawrence Cruz
Attorney, Agent, or Firm—William H. Maxwell

[57] ABSTRACT

A workpiece transport for machine tools and comprised of articulated inner and outer lever arms, the inner lever arm received in a base socket secured to the machine tool, and the outer lever arm pivotally carrying a workpiece support, the articulating axes being vertical and parallel and the workpiece being roughly and finely adjustable into axial alignment with the machine tool, and the workpiece supporting being adjustable to workpiece configuration.

20 Claims, 4 Drawing Sheets

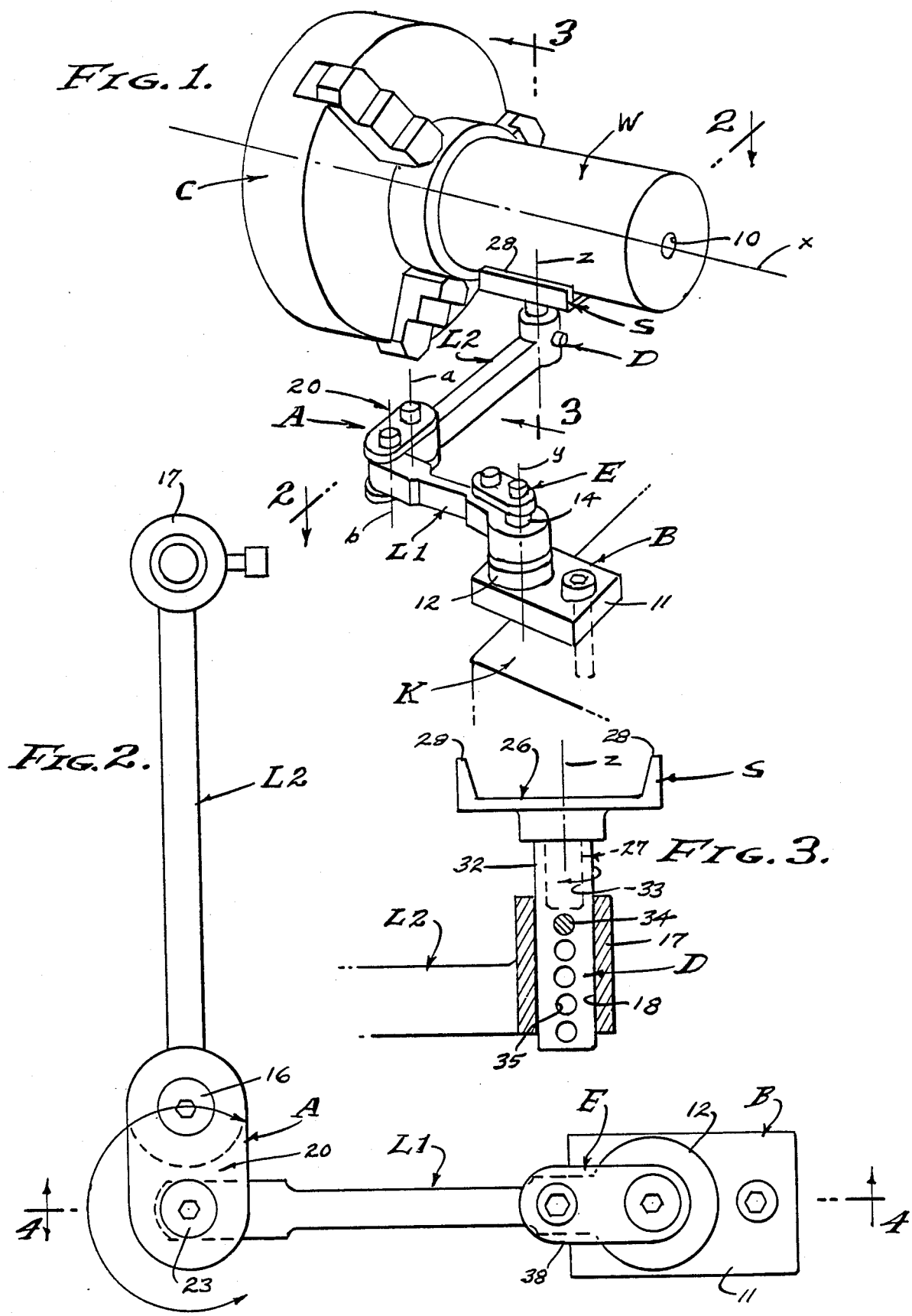

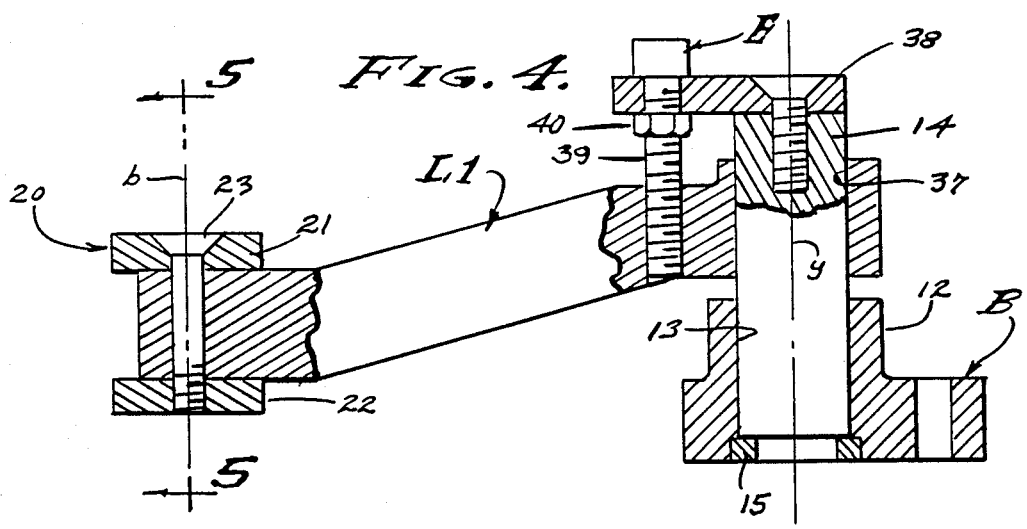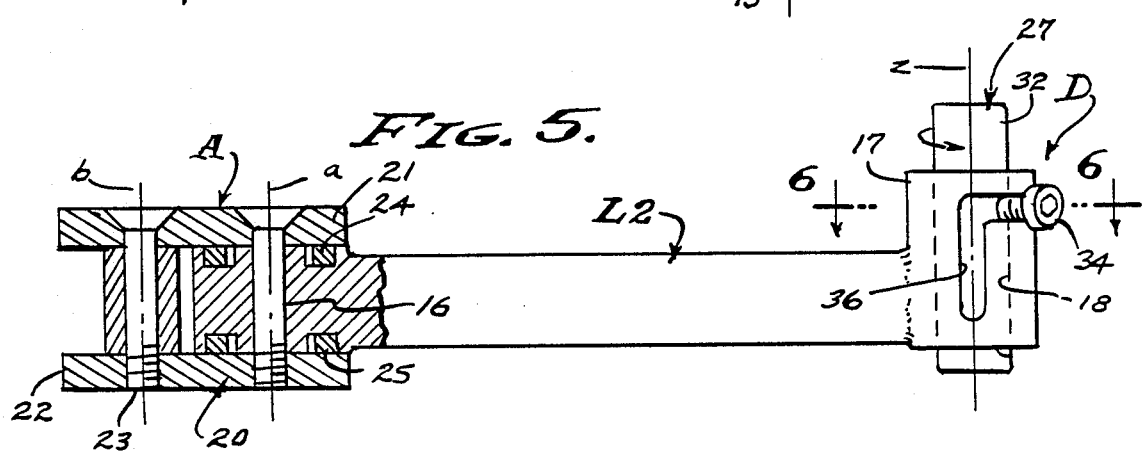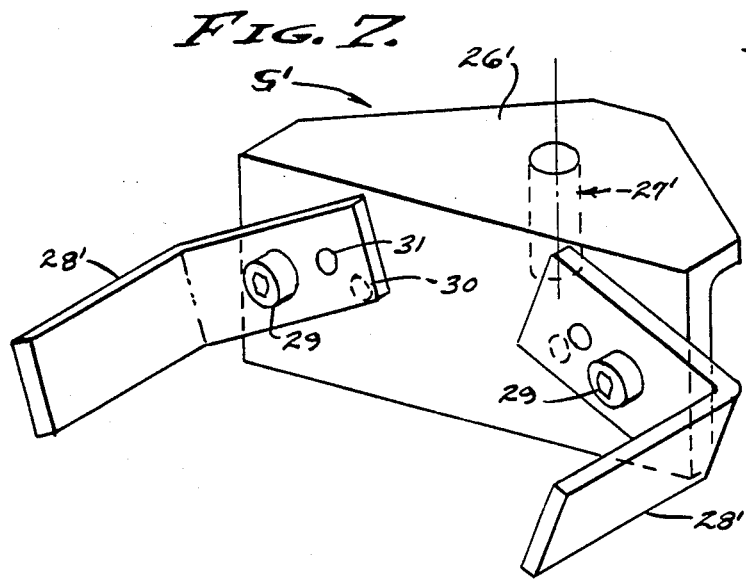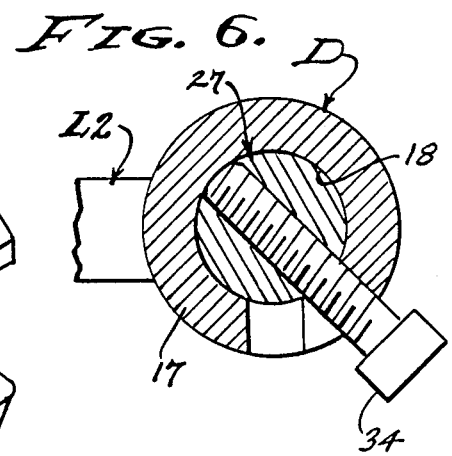

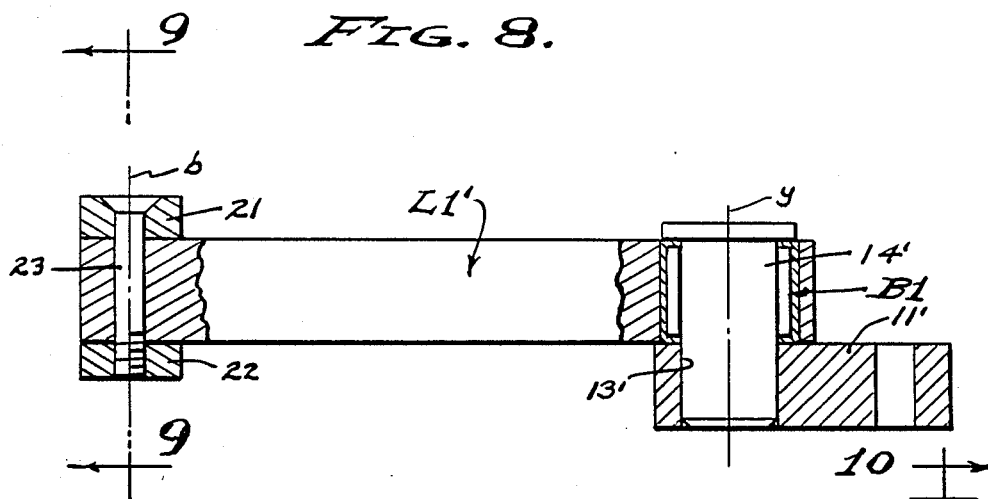
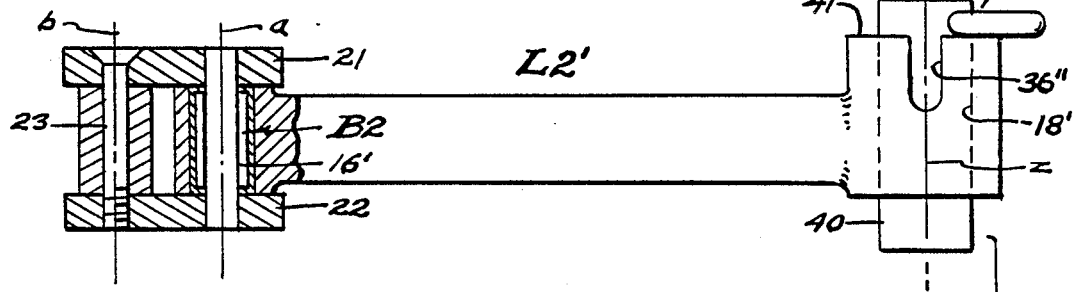
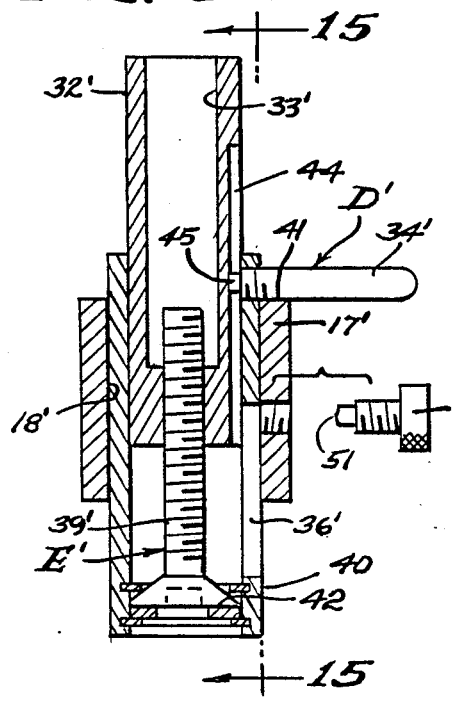
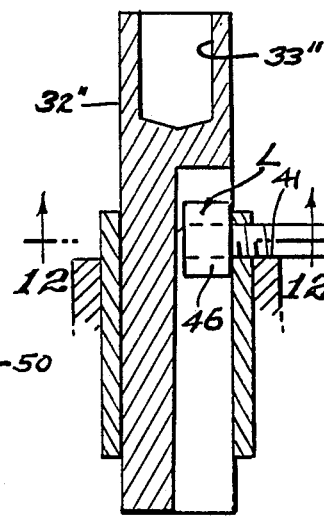
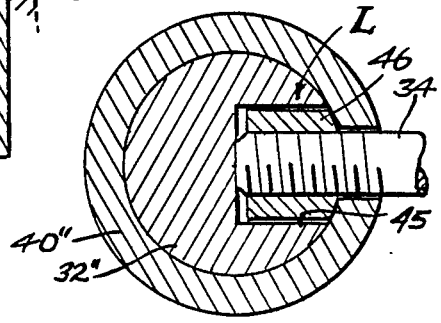

WORK TRANSPORT FOR MACHINE TOOLS

This application is a continuation in part of application Ser. No. 891,114, filed July 31, 1986, now abandoned.

BACKGROUND OF THE INVENTION

This invention relates to machine tools and provides means by which heavy work pieces are moved into and out of machining position secured by a chuck or vice, or to a face-plate or the like. It is very often difficult and awkward to move heavy work pieces into and out of machine tools such as lathes, milling machines, drill presses, and the like. The well equiped machine shop may or may not have an overhead crane, chain-fall or hoist; and these facilities are often ineffectively placed and/or not accessible to the particular machine tool involved. Furthermore, apparatus such as cranes, chain-falls and hoists are slow in operation and do not expedite the process of loading and unloading a machine tool with work. Time is of the essence! For the machinist to load and unload by hand is backbreaking when heavy work parts are involved, and injurious to his well being, for example when handling numerous heavy work pieces at frequent intervals of time. Therefore, it is an object of this invention to provide a work transport for machine tools that carries heavy work pieces into and out of working position in the machine tool for the machining processes to be performed.

Machine tools are characterized by an axis about which the work or a cutting tool is turned, and by a chuck or faceplate or fixture to secure the workpiece for the machining process. In a lathe the workpiece is turned on an axis while secured in a chuck or to a face-plate or fixture, with the cutting tool or bit moved through cutting patterns by a carriage and its various tool positioning features. In a milling machine the workpiece is secured to a carriage or table by a vice or chuck or fixture, with the cutting tool, mill, bit or cutter turned by a spindle on various axes. Drill presses and other machine tools have equivalent features, with respect to the workpiece being placed therein as hereinafter described. Therefore, it is an object of this invention to provide a workpiece support for universal application to the carriages or work tables of machine tools of the character under consideration, a support for moving heavy workpieces into chucking, faceplate, vice gripping or fixture position, all as circumstances require.

Difficulty is encountered when a machinist must manually transport a heavy piece of work over the bed or table of a machine tool and into alignement with the spindle. In a lathe it is the turning axis that must be reached, and in a milling machine it is the spindle axis that must be reached; and the equivalent in other machine tools. The physical posture of the machinist in cantilevering a heavy workpiece is unatural, and destructive to his physical well being. Accordingly, it is an object of this invention to provide apparatus that receives or delivers workpieces alongside the machine tool, and that delivers or receives workpieces from the turning axis, as the case may be. With this invention, the physical posture of the machinist is erect and it is no longer necessary for him to cantilever the workpiece weight from his natural standing posture. That is, the workpiece is loaded, or removed, by the machinist into the work transport means, outside of the awkward confines of the machine tool, from which position the workpiece is transported to and from the work process position.

The configuration of workpieces varies greatly, and the turning center or cutter axis is not always the same. Therefore, it is an object of this invention to provide adjustability with respect to the turning axis and/or to the cutter axis. It is another object of this invention to provide for a rough adjustment of the height at which the workpiece is transported into substantial alignment, and it is still another object of this invention to provide for infinitely variable adjustment of the height at which the workpiece is transported into exact alignment. With this invention, there is rough height adjustment means and there is fine adjustment means. The lateral position and horizontal angular position of the workpiece axis is also a feature of this invention both of which are infinitely variable.

The present invention is to be distinguished from cranes and hoists and the like, which lift from above, and is characterized by a undercarriage type of support that extends into and retracts from the work position in the machine tool. To these ends it is an object of this invention to provide articulation means for the lateral transport of workpieces into and out of alignment with a work placement position. With the present invention, there are inner and outer arms, and the radius of at least one of which involves right-left radius adjustment means. In practice, the right-left radius adjustment means is an adjustable link disposed between the inner and outer arms, so that the work transport can be adapted to either the front or back of the machine tool. The entire apparatus is installed upon a machine tool by means of a base attached to the carriage or ways or table etc.

SUMMARY OF THE INVENTION

The work transport for machine tools as it is disclosed herein is characterized by articulated inner and outer arms that swing horizontally with a workpiece adapter swiveled at the distal end of the outer arm to receive and position a workpiece. The inner arm is pivoted on a base attached to the frame or ways or carriage of the machine tool. And there is radius adjustment of the arms for horizontal extension and retraction. Height of the workpiece adapter is adjustable roughly and/or exactly, and is releasable. The apparatus involving the aforesaid features is transferable from one machine tool to another, and it is readily installed and removed and stored in minimal space.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a perspective illustration of a typical installation of a first form of work transport as it appears with a workpiece in positioned alignment and secured by the jaws of a typical lathe chuck, into and from which position the device can be articulated.

FIG. 2 is a plan view of the work transport device removed from the machine tool and taken as indicated by line 2—2 on FIG. 1.

FIG. 3 is a view of the work transport device and the workpiece adapter thereof and taken as indicated by line 3—3 on FIG. 1.

FIG. 4 is an elevational view of the inner arm of the work transport and taken as indicated by line 4—4 on FIG. 2.

FIG. 5 is an elevational view of the outer arm of the work transport and taken as indicated by line 5—5 on FIG. 4.

FIG. 6 is an enlarged view taken as indicated by line 6—6 on FIG. 5.

FIG. 7 is a perspective view showing an adjustable workpiece adapter.

FIG. 8 is a view similar to FIG. 4 and shows the inner arm mounted by anti-friction bearings.

FIG. 9 is a view similar to FIG. 5 and shows the outer arm coupled by anti-friction bearings and taken as indicated by line 9—9 on FIG. 8.

FIG. 10 is an enlarged sectional view showing combined rough and fine adjustment means and taken as indicated by line 10—10 on FIG. 9.

FIG. 11 is a view similar to FIG. 10 and shows a simplified form of rough and fine adjustment means.

FIG. 12 is an enlarged detailed sectional view taken as indicated by line 12—12 on FIG. 11.

Figure 15:
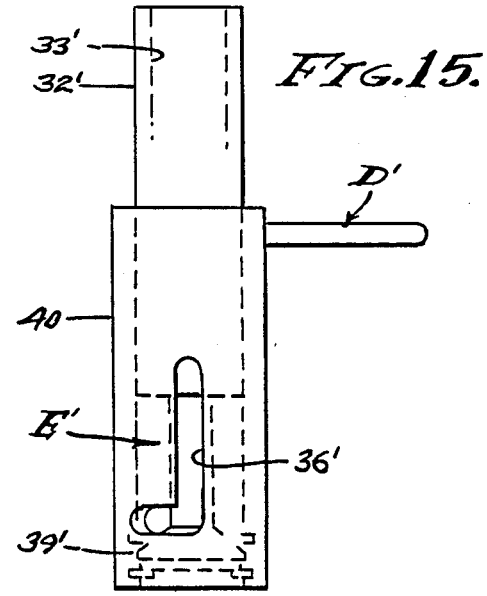

And, FIG. 15 is an elevational view of the adapter shown in FIG. 10 and taken as indicated by line 15—15 therein.

PREFERRED EMBODIMENT

Referring now to the drawings, I have shown this work transport as it is applied to a lathe. However, it is to be understood that it is also applicable to any workpiece handling application involving other like machine tools such as milling machines and any like situation. As shown, there is a lathe spindle turning on an axis x on which a workpiece W is to be processed by turning. The workpiece is secured and driven on this turning axis as by means of a chuck C, a three jaw chuck being shown. A face plate or fixture (not shown) can be installed on the lathe spindle to turn the workpiece, all as circumstances require. Spaced from the head of the lathe there is a carriage K that underlies the turning axis and travels longitudinally upon ways (not shown). It is the carriage K or such a part of the lathe, or other machine tool, to which the work transport device of the present invention is attached, as will be described. It is preferred that an upwardly disposed horizontal face of the machine tool, such as the carriage of a lathe or the table of a milling machine, be employed to mount this workpiece handling device. The workpiece W shown is a flanged cylindrical solid of steel or the like, the flange being gripped in the chuck jaws with a center 10 in the end face, and all of which is concentric with the turning axis x. It is not uncommon for such a workpiece to weigh fifty to seventy pounds, and more.

The work transport involves generally, a base B adaptable to the machine tool, an inner lever arm L1 for lateral transport, an outer lever arm L2 for longitudinal transport, and a workpiece support means S for adapting to various workpieces. The base B is mounted upon the machine tool, temporarily or permanently, and the device is characterized by a lever arm assembly with the arms L1 and L2 coupled by a right-left radius adjustment means A to reverse and to lengthen or to shorten the reach of these two arms as may be required. A feature is that the lever arm assembly is removable from and replaceable on the base B, so as to be useable at either side of the machine tool, and the support means S is removable from and replaceable on the distal end of the outer lever arm L2. Adjustment of the support means S is provided to accomodate workpieces of different diameter, there being rough adjustment means D and fine adjustment means E. A feature is that the rough adjustment means D is releasable so as to drop away from the workpiece when said workpiece is carried by the machine tool.

The base B can vary according to the machine tool configuration to which it is to be attached. A first and adaptable form of base is shown in FIGS. 1, 2 and 4, having a pad 11 with a boss 12 in which there is a vertical bore 13 on a vertical axis y that is moved longitudinally by the machine tool. When mounted to a cross feed carriage or to a milling machine table the mounting could also be considered to move transversely as well. However, in a lathe it is preferred that the mounting be to either side of the main carriage (front or back), as by means of one or more screw fasteners as shown. The pad 11 is block-shaped and cantilevers over the leading edge of the carriage K. Accordingly, the boss is in the nature of a vertically disposed socket installed so as to receive the inner lever arm L1, next described.

The inner lever arm L1 is a rigid member of moderate length adapted to extend forwardly of the lathe carriage K, for example six or six and one half inches between its supported axis y and its coupling axis b. The inner end of arm L1 swings horizontally from the axis y where it revolves on a post 14 received in the bore 13 and projecting upward from the boss 12. The post 14 is slideable into the bore 13 to turn therein and with its bottom end supported upon a bearing ring 15. The outer end of arm L1 carries the coupling axis b that is vertically disposed and spaced parallel from the supported axis y. Accordingly, the lever arm L1 transports the coupling axis b transversely of the machine tool, and in practice through an arc of as much as 180°; a travel of more than twelve inches.

The outer lever arm L2 is also a rigid member of moderate length adapted to extend outwardly (not shown) as well as inwardly (shown) from the coupling axis b, for example seven inches between its coupled axis a (or axis b) and its work support axis z. The inner end of arm L2 swings horizontally from the axis x (or axis b) where it revolves on a pivot 16 carried by the outer end of Arm L1. In practice, the pivot 16 is incorporated in the right-left radius adjustment means A later described. The axes a and/or b are vertically disposed, and the axis z is spaced from and parallel thereto as shown, the distal end of arm L2 carrying a boss 17 having a bore 18 adapted to slideably receive the mounting pin of the work support means S later described. In practice, the height of boss 17 is immediately above the carriage K level, a distance equal to the thickness of pad 11 and well below the axis x as shown in FIG. 4, by providing one of the arms, preferably arm L1, with a downward offset. Accordingly, the lever arm L2 transports the adapter axis z transversely as well as longitudinally through an arc of as much as 180°; a travel of fourteen inches in addition to the aforementioned twelve inch travel of arm L1.

In FIGS. 8 and 9 of the drawings I have shown straight arms L1' and L2' revolving and pivoting on anti-friction bearings B1 and B2 at axes y and a. The base 11' has no boss (12), eliminating the need for a dogleg in lever arm L1, which is now straight and horizontal and immediately above the support plane of carriage K. In practice, the post 14' is a pin that revolves free in the anti-friction needle bearing B1, and slides into the bore 13'. The outer end of inner arm L1' is the same as arm L1 above described, carrying the links 21 and 22 clamped in position by the screw fastener 23. However, the pivot 16' is a pin press fitted through the links 21 and 22 and free to turn in the anti-friction needle bearing B2. The bearings B1 and B2 are lightly pressed into their respective arms.

The right-left radius adjustment means A is provided to change from a right hand to a left hand installation and to lengthen or shorten the reach of the arms L1 (L1') and L2 (L2'), by adjusting the position and radius of the outer arm as may be required. Means A is characterized by a toggle 20 that is angularly set on axis b to project from right or left of the distal end of arm L1 and that pivotally carries the arm L2. In practice, the toggle 20 is comprised of a pair of upper and lower links 21 and 22 that are clamped to the top and bottom parallel faces of the arm L1 by a screw fastener 23. The projecting ends of the toggle links 21 and 22 are aligned by the pivot 16 in the form of a screw fastener on axis a that draws their parallel inner faces into sliding engagement with top and bottom bearing rings 24 and 25 pivotally supporting the arm L2. Normally, the toggle 20 is set to project inwardly toward the axis x as shown, in which case the radius of arm is reduced. Also, the toggle 20 can be set to project radially from the arm, in which case the radius of arm L1 is increased. The toggle 20 establishes a dogleg coupling between the arms L1 and L2 for adjusting the arm configuration from right to left and to clear obstacles as may be required.

The support means S can vary according to the workpiece configuration, a typical workpiece support S being shown in FIGS. 1 and 3 of the drawings. As shown, means S is comprised of a horizontal cradle 26 swiveled so as to pivot on axis z by a mounting pin 27 slideably engaged in the bore of boss 17. The cradle 26 is comprised of spaced parallel rails 28 symetrical about the turning axis z which transports the workpiece into and out of working position, as manipulated by the machinist. A second typical form of support S' is shown in FIG. 7, comprised of adjustable rails 28' secured to the cradle 26' by screw fasteners 29. Support means S' is adapted to transport large diameter pieces such as a heavy faceplate or the like, and is comprised of a drop-down cradle turning upon a mounting pin 27', with multiple holes 30 and 31 in the cradle and rails for adjustment of the rails which are also angularly set by the fasteners 29.

The rough adjustment means D as shown in FIGS. 1, 3, 5 and 6 is associated with the arm L2 and the support means mounting pin 27 (27') above described. A feature of means D is that it adjusts the support cradle to a height from which it is releasable to drop clear and beneath the workpiece W when it is being placed or removed from the machine tool. In accordance with this invention the mounting pin 27 (27') is sectional, having an adjustable barrel section 32 rotatably slideable in the socket 18 and with a socket 33 receiving the mounting pin 27 (27'). The barrel section 32 has an upper socket portion that is extended from the level of and to a position above the boss 12 by means of a bolt 34 engaged therethrough and through the boss. A shown in FIG. 3, there is a series of bolt openings 35 through the barrel section, and release of the bolt is by means of a J-slot 36 or the like in the side wall of the boss. Any one of the bolt openings can be selected for general height as by threading the bolt therein, and the bolt releasably supported by the J-slot, as clearly shown in the drawings.

The fine adjustment means E, as shown in FIGS. 1, 2 and 4, is associated with the arm L1 and the base B above described. A feature of this means is that it infinitely adjusts the support cradle to a height with the workpiece W concentric with the turning axis x. In accordance with this invention the supporting post 14 slideably receives a bore 37 in the inner end of arm L1, there being a header 38 extending from the top of the post to overlie the arm. A jack-screw 39 turns free in the arm and depends therefrom to screw thread into the arm on an axis parallel to axis y. The head of the jack-screw 39 carries the arm L1 to an adjusted height where it can be locked by a nut 40 engaged beneath the header. The means E assembly turns together with the arm L1, the post 14 revolving in the supporting base socket 13. Accordingly, the cradle height can be accurately adjusted to position the workpiece W concentric with the axis x.

Referring now to the rough and fine adjustment means D' and E' of FIGS. 9 and 10 of the drawings, the barrel section 32' is fnely adjusted in a sleeve 40 roughly adjusted in the bore 18' of boss 17'. The J-slot 36' is in a sleeve 40 that carries the adjustable barrel section 32', the J-slot being engaged by a dog-point screw 50 carried by the boss 17'. The bolt 34' is employed for manipulation, and the boss 17' can be simplified by replacing the first described J-slot (36) with a vertical upwardly open slot 36" (see FIG. 9) so that the bolt 34' can rest therein or upon the upper face 41 of the boss. The bolt 34' of rough adjustment means D' is carried by the sleeve 40 to project radially therefrom for manipulation into and out of the slot 36" and onto or off of the face 41, and alternately the J-slot 36' is positioned on the dog-point screw 50, as may be required for rough adjustment.

Fine adjustment of means E' is achieved by means of jack-screw 39' supported upon a shoulder 42 at the bottom of sleeve 40. The jack-screw 39' is turned means of a key or wrench 43 and is threadedly engaged into the bottom of the barrel section 32' to raise and lower the same. The barrel section 32' is prevented from turning by means of a vertical slot 44 in the side thereof and. engaged with a dog-point 45 carried at the inner end of bolt 34'. In practice, the shoulder 42 is established by a plate secured by a snap ring, and similarly the jack screw is also retained by a snap ring, both as indicated. The sleeve 40 is slideably disengageable in the bore 18'.

Referring now to the rough and fine adjustment means D" and E" of FIGS. 11 and 12, the barrel section 32" is finely adjusted in a sleeve 40" roughly adjusted in the bore 18' of boss 17'. The vertically open slot 36" is employed here as shown in FIG. 9, for rough adjustment of means D" so that the bolt 34" can engage therein or upon the face 41 (see FIG. 11). Fine adjustment of means E" is achieved by means of lock means L that also carries the bolt 34". The barrel section 32" is provided with a coextensive slot 45 beneath the socket 33", in which a guide nut 46 operates to clamp within the sleeve 40" while the inner end of bolt 34" bears upon a downwardly and inwardly tapered bottom of the slot (see FIG. 11) thereby securing and inherently locking the barrel section 32" as to height in the sleeve 40"

supported by the bolt 34". The sleeve 40" is slideable from the bore 18'.

Figure 13:
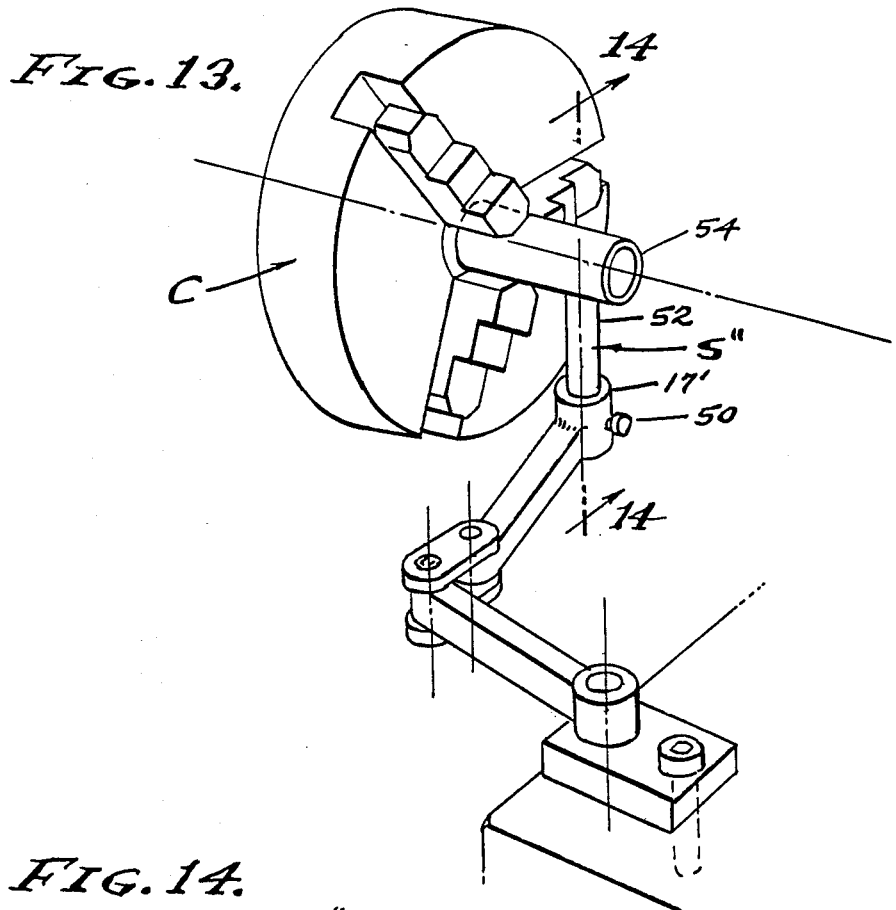
FIG. 13 is a perspective illustration similar to that of FIG. 1 and shows the work transport as it appears with a chuck in positioned alignment with the axis of a lathe spindle.
Figure 14:
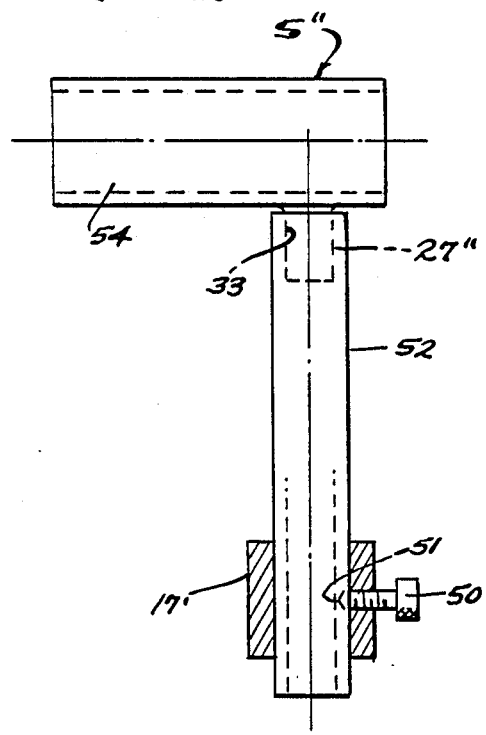
FIG. 14 is an elevational view of a chuck adapter taken as indicated by line 14—14 on FIG. 13.

Referring now to FIG. 13 of the drawings, there is a typical lathe chuck C which is transported into and out of working position on the lathe spindle (not shown) by support means S" having a member 52 slideably engaged in the bore 18' of boss 17' to be secured by a cone point 51 of the dog-point screw 50. The member 52 is a vertical extension having a socket 33, the same as that of barrel section 32, to receive the pin 27" of support S" in the form of a horizontal cylinder or tube 54 adapted to enter the jaws of an carry the chuck C. In practice, the height of the cylinder or tube 54 is established for any particular machine tool by forming a detent or dog-point hole in the side wall of member 52, at the required height, to receive the cone point 51 or dog-point of screw 50. Thus, a chuck C can be easily transported onto and off of the lathe spindle.

From the foregoing it will be seen that it is a simple matter for a machinist to load the work transport at the side of a machine tool (front or back) while standing in a natural erect posture, from which position the work transport carries the the weight of the workpiece object, check or fixture or faceplate, while it is being moved into working position in the machine tool. And alternately, to remove that object, still with the machinist always in a natural erect posture. Awkwardness is avoided and this is not only beneficial for the machinist, but also avoids accidents, since the object is reliably supported until engaged on or in the machine tool, or when being removed therefrom.

Having described only the typical preferred forms and modifications of my invention, I do not wish to be limited or restricted to the specific details herein set forth, but which to reserve to myself any modifications or variations that may appear to those skilled in the art as set forth within the limits of the following claims.

I claim:

1. A workpiece transport for machine tools and the like, wherein a workpiece is to be moved between a lateral loading or unloading position and an aligned chucking or working position, and including:
   a horizontally disposed inner lever arm with a vertical coupling axis at its outer distal end,
   means for pivotally securing an inner end of said inner lever arm to a part of the machine tool on a vertical supporting axis to swing horizontally and laterally of the machine tool,
   a horizontally disposed outer lever arm with a vertical adapter axis at its outer distal end,
   right-left radius means pivoting an inner end of said outer lever arm on the vertical coupling axis at the distal end of the inner lever arm to swing horizontally of the machine tool and to position the vertical coupling axis at opposite sides of the inner lever arm and with respect to the vertical support axis,
   workpiece support means pivoted on the vertical adapter axis at and perpendicular to the distal end of the horizontally disposed outer lever arm to move therewith between the lateral loading or unloading position and the aligned chucking or working position underlying and supporting the workpiece with respect to the machine tool,
   and height adjustment means at the distal end of the outer lever arm for controlling the height position of the workpiece support means and comprised of a mounting pin-member depending from the workpiece support means and slideably received in a boss at the distal end of the outer lever arm.

2. The workpiece transport for machine tools and the like as set forth in claim 1, wherein the means for pivotally securing the inner end of said inner lever arm in said vertical supporting axis is comprised of a base having means for attachment to said part of the machine tool and having a socket rotatably receiving a post depending from the inner lever arm.

3. The workpiece transport for machine tools and the like as set forth in claim 1, wherein the means pivoting the inner end of said inner lever arm is an anti-friction bearing means.

4. The workpiece transport for machine tools and the like as set forth in claim 1, wherein the means pivoting the inner end of said outer lever arm at the distal end of the inner lever arm is an anti-friction bearing means.

5. The workpiece transport for machine tools and the like as set forth in claim 1, wherein the means pivoting the inner end of said inner lever arm is an anti-friction bearing means, and wherein the means pivoting the inner end of said outer lever arm at the distal end of the inner lever arm is an anti-friction bearing means.

6. The workpiece transport for machine tools and the like as set forth in claim 1, wherein the workpiece support means at the distal end of the outer lever arm is comprised of a boss and a workpiece adapter with a mounting pin-member depending therefrom and pivotally received in the boss.

7. The workpiece transport for machine tools and the like as set forth in claim 1, wherein the means for pivotally securing the inner end of said inner lever arm on said vertical supporting axis is comprised of a base having means for attachment to said part of the machine tool and having a socket rotatably receiving a post depending from the inner end of the inner lever arm, and wherein the workpiece support means at the distal end of the outer lever arm is comprised of the boss at the distal end of the outer lever arm and a workpiece adapter with a mounting pin-member depending therefrom and pivotally received in the boss.

8. The workpiece transport for machine tools and the like as set forth in claim 1, wherein the right-left radius means at the distal end of the inner lever arm is comprised of a toggle having spaced inner and outer axes and extending between the inner and outer lever arms and with the inner axis of the toggle on a vertical axis through the distal end of the inner lever arm and with the outer axis of the toggle on the vertical coupling axis at the distal end of the inner lever arm and rotatably carrying the outer lever arm.

9. The workplace transport for machine tools and the like as set forth in claim 8, wherein the right-left radius adjustment means at the distal end of the inner lever arm is comprised of upper and lower toggle links clamped by screw means to the distal end of the inner lever arm, the toggle links having a pivot at their outer axis freely pivoting the outer lever arm.

10. The workpiece transport for machine tools and the like as set forth in claim 8, wherein the right-left radius adjustment means at the distal end of the inner lever arm is comprised of upper and lower toggle links clamped by screw means to the distal end of the inner lever arm, the toggle links having a pivot at their outer axis freely pivoting the outer lever arm on anti-friction bearing means.

11. The workpiece transport for machine tools and the like as set forth in claim 1, there being a series of both openings to receive a replaceable bolt passed through one of said bolt openings to roughly adjust the height of the workpiece support means with respect to the machine tools.

12. The workpiece transport for machine tools and the like as set foth in claim 1, there being a vertical slot open at the top face of the boss at the distal end of the outer lever arm to hold a raised position of a manually placed bolt subject to release into the slot to lower the height of the workpiece support with respect to the machine tool.

13. The workpiece transport for machine tools and the like as set forth in claim 1, there being a J-slot with a lateral portion to hold a raised position of a manually placed bolt subject to release into a vertical portion to lower the height of the workpiece support means with respect to the machine tool.

14. The workpiece transport for machine tools and the like as set forth in claim 1, wherein height adjustment means for fine adjustment of the workpiece is comprised of a base having means for attachment to said part of the machine tools and having a post adjustably received in a base, and a vertical bore through the inner lever arm slideable on the post, there being a jack screw extending between the post and the inner lever arm and operating to finely adjust the height thereof and of the workpiece support means.

15. The workpiece transport for machine tools and the like as set forth in claim 1, wherein the height adjustment means is comprised of a pin section depending from the workpiece support means and slideably received in a sleeve carried by a boss at the distal end of the outer lever arm, a fine adjustment means positioning the pin section in the sleeve, and a rough adjustment means comprising a vertical slot open at the top face of the boss and a manually placed bolt engageable on said face to hold a raised position thereof and subject to release into the slot to lower the bolt and height of the workpiece support with respect to the machine tool.

16. The workpiece transport for machine tools and the like as set froth in claim 1, wherein the height adjustment means is comprised of a pin section depending from the workpiece support means and slideably received in a sleeve carried by a boss at the distal end of the outer lever arm, a fine adjustment means positioning the pin section in the sleeve, and a rough adjustment means comprising a J-slot with a lateral portion to hold a raised position of a manually placed bolt subject to release into a vertical portion thereof to lower the bolt and height of the workpiece support means with respect to the machine tool.

17. The workpiece transport for machine tools and the like as set forth in claim 15, wherein the fine adjustment means is comprised of a vertical slot in the pin section and a lock nut in said vertical slot to receive a manually placed bolt for tightening within the sleeve.

18. The workpiece transport for machine tools and the like as set forth in claim 16, wherein the fine adjustment means is comprised of vertical slot in the pin section and a lock nut in said vertical slot to receive the manually placed bolt for tightening within the sleeve.

19. The workpiece transport for machine tools and the like as set forth in claim 15, wherein the fine adjustment means is comprised of a jack screw seated at and accessible through the bottom of the sleeve and threadedly engaged into a bore in the pin section slideably engaged in the sleeve with means preventing rotation thereof within the sleeve.

20. The workpiece transport for machine tools and the like as set forth in claim 16, wherein the fine adjustment means is comprised of a jack screw seated at and accessible through the bottom of the sleeve and threadedly engaged into a bore in the pin section slideably engaged in the sleeve with means preventing rotation thereof within the sleeve.

* * * * *